(12) United States Patent
Babannavar et al.

(10) Patent No.: US 10,904,595 B2
(45) Date of Patent: Jan. 26, 2021

(54) SYSTEM AND METHOD FOR JUST IN TIME EMBEDDED WATERMARKING OF STREAMING PROXIES

(71) Applicant: PRIME FOCUS TECHNOLOGIES, INC., Burbank, CA (US)

(72) Inventors: Raju Babannavar, Karnataka (IN); Ajay Jose, Bangalore (IN); Vimalesh Gul Melwani, Bangalore (IN); Ramakrishnan Sankaranarayanan, Mumbai (IN)

(73) Assignee: PRIME FOCUS TECHNOLOGIES, INC., Burbank, CA (US)

( * ) Notice: Subject to any disclaimer, the term of this patent is extended or adjusted under 35 U.S.C. 154(b) by 0 days.

(21) Appl. No.: 16/107,808

(22) Filed: Aug. 21, 2018

(65) Prior Publication Data

US 2020/0068238 A1 Feb. 27, 2020

(51) Int. Cl.
| | | |
|---|---|---|
| *H04N 21/2389* | (2011.01) | |
| *H04N 21/2343* | (2011.01) | |
| *H04N 19/40* | (2014.01) | |
| *H04N 19/184* | (2014.01) | |
| *H04N 21/2381* | (2011.01) | |
| *H04N 21/8358* | (2011.01) | |

(52) U.S. Cl.
CPC ..... *H04N 21/23892* (2013.01); *H04N 19/184* (2014.11); *H04N 19/40* (2014.11); *H04N 21/2381* (2013.01); *H04N 21/234309* (2013.01); *H04N 21/8358* (2013.01)

(58) Field of Classification Search
CPC .......... H04N 21/23892; H04N 19/184; H04N 19/40; H04N 21/234309; H04N 21/2381; H04N 21/8358
See application file for complete search history.

(56) References Cited

U.S. PATENT DOCUMENTS

| | | | | |
|---|---|---|---|---|
| 10,147,433 B1* | 12/2018 | Bradley | ................ | G10L 19/018 |
| 2005/0193205 A1* | 9/2005 | Jacobs | ................... | G06F 21/10 |
| | | | | 713/176 |

(Continued)

FOREIGN PATENT DOCUMENTS

| | | |
|---|---|---|
| CN | 101325702 A | 12/2008 |
| KR | 10-1744744 B1 | 6/2017 |

*Primary Examiner* — Thai Q Tran
*Assistant Examiner* — Sunghyoun Park
(74) *Attorney, Agent, or Firm* — Seed IP Law Group LLP

(57) ABSTRACT

A system and method for just-in-time embedded watermarking of streaming digital content. The system employs sequential processing to transcode streaming content to embed a user-specific watermark into the streaming content. Additionally, the just-in-time embedded watermarking system transcodes short segments of content on an as-needed basis, in response to user requests, instead of performing bulk transcoding of large amounts of content at once. Accordingly, the just-in-time embedded watermarking system provides consistent and predictable user playback experience. Further, the system automatically supports adaptive bit rate optimization by providing interoperability with multiple potential adaptive bit rates requestable by the content player device. The system watermarks the requested content segment in real-time during the streaming of the content by causing burn-in of the user-specific watermark into the streaming content.

31 Claims, 4 Drawing Sheets

(56) References Cited

U.S. PATENT DOCUMENTS

| | | | |
|---|---|---|---|
| 2010/0058485 A1* | 3/2010 | Gonzalez | G06F 21/10 726/27 |
| 2010/0150244 A1* | 6/2010 | Jia | H04N 19/176 375/240.25 |
| 2013/0097309 A1* | 4/2013 | Ma | H04L 29/08099 709/224 |
| 2013/0128120 A1* | 5/2013 | Chanda | H04N 5/44504 348/600 |
| 2013/0332971 A1* | 12/2013 | Fisher | H04N 21/266 725/93 |
| 2014/0270331 A1* | 9/2014 | Zhao | G06T 1/005 382/100 |
| 2014/0325550 A1 | 10/2014 | Winograd et al. | |
| 2015/0067718 A1 | 3/2015 | Gregotski | |
| 2015/0382034 A1 | 12/2015 | Thangaraj et al. | |
| 2016/0150297 A1* | 5/2016 | Petrovic | H04N 19/65 725/25 |
| 2016/0269765 A1* | 9/2016 | Mandyam | H04N 21/2541 |
| 2016/0337426 A1* | 11/2016 | Shribman | H04L 65/4084 |
| 2016/0339341 A1* | 11/2016 | Gault | A63F 13/54 |
| 2017/0345119 A1* | 11/2017 | Asthana | G06T 1/0071 |
| 2018/0302660 A1* | 10/2018 | Olechowski | H04N 21/234309 |
| 2018/0343491 A1* | 11/2018 | Loheide | G06Q 30/0251 |

* cited by examiner

SYSTEM AND METHOD FOR JUST IN TIME EMBEDDED WATERMARKING OF STREAMING PROXIES

COPYRIGHT NOTICE

A portion of the disclosure of this patent document contains material that is subject to copyright protection. The copyright owner has no objection to the facsimile reproduction by any one of the patent document or the patent disclosure, as it appears in the Patent and Trademark Office patent files or records, but otherwise reserves all copyright rights whatsoever.

TECHNICAL FIELD

This disclosure relates generally to a system and method for watermarking of streaming digital content and, more particularly, to a system and method for "just-in-time" embedded watermarking of streaming digital content.

BACKGROUND

Today, most audio and video content that is pre-released (e.g., which has to go through content operations such as reviews, screening reviews, localization, and the like) leaves the organization boundary with a sufficiently high risk of content leakage. Accordingly, given the large revenues at stake, strong security controls need to be implemented to protect such high-value content. Traditionally, some key strategies are employed that make it more difficult to leak such content.

One such strategy is to make far fewer copies of the content. Ideally, this strategy is implemented by having only one copy of the content, and making the content "streamable" through a secured system. In this manner, reducing the number of copies in turn reduces the probability of content reaching the wrong hands.

In another such strategy, the content streaming platforms incorporate strong deterrence strategies to prevent or substantially reduce the copying, sharing, and/or stealing of content. These deterrence mechanisms must be sufficient to deter people from leaking such high-value content. While applying user-specific watermarks is a well-accepted deterrent, streaming proxies face a typical challenge when it comes to water-marking streaming content in an "on-the-fly" process.

Some traditional techniques have incorporated overlay watermarking, in which a watermark is "overlaid" in a layer on top of the content. Overlay watermarking technologies provide an overlay on the content player, and present the appearance of a watermark being generally employed. Such an overlay watermarking technique is generally a client-side procedure, rather than a server-side procedure, since overlay watermarking is not a processor-intensive technique. However, overlay watermarking has some security limitations, as it is not as robust as embedding (or "burning in") the watermark into the content. Notably, embedded watermarking is a processor-intensive technique, which thus has its own limitations in implementation, such as user-experience challenges.

Significantly, embedded watermarking is generally a time-consuming process, and hence interferes with the overall user experience due to buffering requirements. Additionally, forensic watermarks provide even further deterrents to users from engaging in such activities. A forensic watermark has the ability to trace back to the original source of the leak due to the forensically embedded information. A combination of these techniques is generally considered a strong deterrent for people engaging in such activities.

Additionally, if content is actually leaked, sufficient controls need to be incorporated to minimize the scale of the content leak. Traditional strategies include stream encryption, user-specific content encryption, and one-time playback. Furthermore, a forensically watermarked content often deters people from engaging in large-scale sharing activities, for fear of traceability. However, as discussed above, such content streaming security measures are a time-consuming process that interferes with the overall user experience due to buffering requirements. Accordingly, there is a continuing need in the art for content streaming security measures that provide a high level of security while still providing an acceptable processing time that does not disrupt the overall user experience.

Notably, all of the subject matter discussed in this section is not necessarily prior art, and should not be assumed to be prior art merely as a result of its discussion in this section. Accordingly, any recognition of problems in the prior art discussed in this section or associated with such subject matter should not be treated as prior art unless expressly stated to be prior art. Instead, the discussion of any subject matter in this section should be treated as part of the identification of the technological problem to be overcome, which in and of itself may also be inventive.

BRIEF SUMMARY

Briefly, and in general terms, a method is disclosed for embedded watermarking of streaming digital content, wherein an embedded watermarking system is positioned between a content player device of a user and a streaming server. The method includes: intercepting a streaming segment of content, via the embedded watermarking system, requested by a user from the streaming server, the embedded watermarking system associated with a graphics processing unit; sequentially transcoding the streaming segment of content in real-time, using the graphics processing unit (GPU), on an as-needed basis, to embed a user-specific watermark into the streaming segment of content; once transcoded, delivering the streaming segment of content to the content player device for playback to a user; delivering consistent and predictable user playback experience; and automatically supporting adaptive bit rate optimization by providing interoperability with multiple potential adaptive bit rates requestable by the content player device.

In one or more implementations of the embedded watermarking method, the streaming segment of content is in an adaptive streaming format selected from Dynamic Adaptive Streaming over HTTP (DASH), HTTP Live Streaming (HLS), Microsoft Smooth Streaming (MSS), and HTTP Dynamic Streaming (HDS). In another aspect of some implementations, each streaming segment of content has a segment length of 1, 2, 4, 5, 6, 10, or 15 seconds. In still another aspect of some implementations, the embedded watermarking system resides on a web server, and the web server persists the streaming segment received from the streaming server onto a TMPFS partition. In yet another aspect of some implementations, the embedded watermarking system on the web server employs FFMPEG to provide GPU-based transcoding of the streaming segment of content. In some implementations, user-specific details, which are used for user-specifically embedded watermarking the streaming segment of content, are supplied as part of the FFMPEG command.

In another aspect of some implementations of the embedded watermarking method, the embedded watermarking system incorporates GPU-based transcoding and optimizations that include segment prefetching. In still another aspect of some implementations, the embedded watermarking system produces transcoding speeds in a range of three to six times real-time speed. In yet another aspect of some implementations, the embedded watermarking system utilizes an NV6 Virtual Machine from a Virtual Machine Stack. In some implementations, the embedded watermarking system incorporates GPU-based transcoding without any central processing unit (CPU)-based transcoding being performed, and the embedded watermarking system incorporates sequential processing without any parallel processing being performed.

In another implementation, a method is disclosed for embedded watermarking of streaming digital content, wherein an embedded watermarking system is positioned between a content player device of a user and a streaming server. The method includes: intercepting a request for an adaptive streaming format of a streaming segment of content, via the embedded watermarking system, by a user that was originally directed to the streaming server, the embedded watermarking system associated with a graphics processing unit; forwarding the request for the streaming segment of content to the streaming server; intercepting the streaming segment of content, via the embedded watermarking system, from the streaming server, which was originally directed to the content player device of the user; sequentially transcoding the streaming segment of content in real-time, using the graphics processing unit (GPU), on an as-needed basis, to embed a user-specific watermark into the streaming segment of content; temporarily storing the watermarked streaming segment of content; once transcoded, delivering the watermarked streaming segment of content to the content player device for playback to the user; delivering consistent and predictable user playback experience; and automatically supporting adaptive bit rate optimization by providing interoperability with multiple potential adaptive bit rates requestable by the content player device.

In still another implementation, a system is disclosed for the embedded watermarking of streaming digital content that is positioned between a content player device of a user and a streaming server. The system includes: one or more processors; and a memory device storing a set of instructions that when executed by the one or more processors, causes the one or more processors to: intercept a streaming segment of content, via the embedded watermarking system, requested by a user from the streaming server, the embedded watermarking system in communication with a graphics processing unit; sequentially transcode the streaming segment of content in real-time, using the graphics processing unit (GPU), on an as-needed basis, to embed a user-specific watermark into the streaming segment of content; once transcoded, deliver the streaming segment of content to the content player device for playback to a user; deliver consistent and predictable user playback experience; and automatically support adaptive bit rate optimization by providing interoperability with multiple potential adaptive bit rates requestable by the content player device.

In another implementation, a system is disclosed for the embedded watermarking of streaming digital content that is positioned between a content player device of a user and a streaming server. The embedded watermarking system includes a processor-based web server that is configured to intercept a streaming segment of content requested by a user from the streaming server and a graphics processing unit associated with a graphics processing unit-based transcoder and the web server. The graphics processing unit sequentially transcodes the streaming segment of content in real-time, on an as-needed basis, and embeds a user-specific watermark into the streaming segment of content. The web server delivers the watermarked streaming segment of content to the content player device for playback to a user. The embedded watermarking system delivers consistent and predictable user playback experience. Additionally, the embedded watermarking system automatically supports adaptive bit rate optimization by providing interoperability with multiple potential adaptive bit rates requestable by the content player device.

In one or more implementations of the embedded watermarking system, the streaming segment of content is in an adaptive streaming format selected from Dynamic Adaptive Streaming over HTTP (DASH), HTTP Live Streaming (HLS), Microsoft Smooth Streaming (MSS), and HTTP Dynamic Streaming (HDS). In another aspect of some implementations, each streaming segment of content has a segment length of 1, 2, 4, 5, 6, 10, or 15 seconds. In other implementations, each streaming segment of content has a segment length of a different number of seconds (i.e., a segment length different than 1, 2, 4, 5, 6, 10, or 15 seconds). In still another aspect of some implementations, the embedded watermarking system resides on a web server, and the web server persists the streaming segment received from the streaming server onto a TMPFS partition. In yet another aspect of some implementations, the embedded watermarking system on the web server employs FFMPEG to provide GPU-based transcoding of the streaming segment of content. In some implementations, user-specific details, which are used for user-specifically embedded watermarking the streaming segment of content, are supplied as part of the FFMPEG command.

In another aspect of some implementations of the embedded watermarking system, the embedded watermarking system incorporates GPU-based transcoding and optimizations that include segment prefetching. In still another aspect of some implementations, the embedded watermarking system produces transcoding speeds in a range of three to six times real-time speed. In yet another aspect of some implementations, the embedded watermarking system utilizes an NV6 Virtual Machine from a Virtual Machine Stack. In some implementations, the embedded watermarking system incorporates GPU-based transcoding without any central processing unit (CPU)-based transcoding being performed, and the embedded watermarking system incorporates sequential processing without any parallel processing being performed.

These features with other technological improvements, which will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale, and elements of similar structures or functions are generally represented by like reference numerals for illustrative purposes throughout the figures. The figures are only intended to facilitate the description of the various embodi

DETAILED DESCRIPTION

Figure 1:
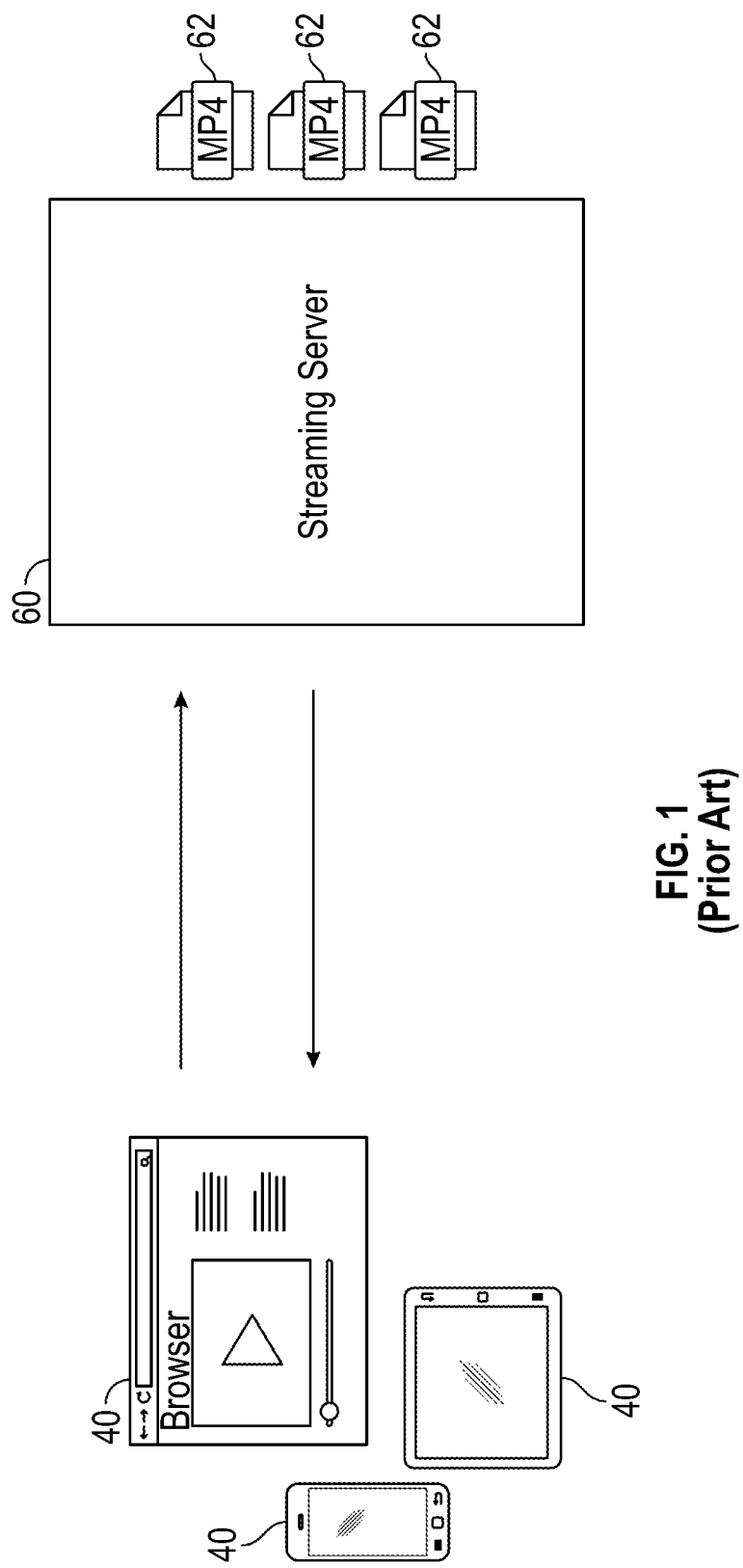
- FIG. 1 illustrates a traditional stream content system architecture, in accordance with one or more implementations.

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide a system and method for just-in-time embedded watermarking of streaming digital content. Representative examples utilizing many of these additional features and teachings, both separately and in combination, are described in further detail with reference to attached FIGS. 1-4. This detailed description is intended to teach a person of skill in the art further details for practicing aspects of the present teachings, and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a sequence of steps leading to a desired result. The steps are those requiring physical manipulations of physical quantities.

Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes. Such a computer program may be stored in a computer readable storage medium, such as, but not limited to, any type of disk, including floppy disks, optical disks, CD ROMs, and magnetic optical disks, read only memories (ROMs), random access memories (RAMs), EPROMs, EEPROMs, magnetic or optical cards, or any type of media suitable for storing electronic instructions, and each coupled to a computer system bus.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

An embodiment is shown of the system and method for just-in-time embedded watermarking of streaming digital content. Referring now to the drawings, wherein like reference numerals denote like or corresponding parts throughout the drawings, and more particularly to FIGS. 2-4, there is shown a system and method for just-in-time embedded watermarking of streaming digital content.

The system and method for just-in-time embedded watermarking of streaming digital content 100 overcomes the technical problem of generating a user-specific visible watermark on content provided by streaming proxies. The user-specific visible watermark is achieved by performing a "burn-in" on each segment of the video stream of content. In this process, an image is burned into each and every single frame of the video stream of content. The system and method for just-in-time embedded watermarking of streaming digital content provides a technical solution by transcoding only the specific streaming segments 62 requested by the player. In this regard, the system and method for just-in-time embedded watermarking of streaming digital content 100 is unique in its approach, since it performs Just-in-Time (JIT) embedded watermarking by transcoding only the specifically requested streaming segments of content, instead of performing bulk segmentation and bulk transcoding of all of the content, before the streaming of the content.

As shown in FIG. 1, in traditional watermarking systems 10, the user requests the streaming of an asset or particular title of content (e.g., television show, movie, and the like) from a streaming server 60. In response to this request, the streaming server 60 performs a massive transcoding of each and every segment of the entire title of content in bulk. In some traditional systems, the bulk transcoding is performed in parallel, using a plurality of servers to assist in handling this extremely large transcoding project. Parallel transcoding requires significantly increased complexity and expenses. In this type of traditional technique, the bulk transcoding must be completed before the particular title of content will stream to the user's content player device 40 and play for the user. Thus, the user will experience long buffering periods of time when these traditional techniques for embedded watermarking are used with streaming content. Furthermore, if the user does not finish viewing the entire title of content or if the user skips around in the timeline of the content, then all the transcoding (and associated wait time for the bulk transcoding) will have been unnecessary. Notably, traditional content streaming systems employ only standard "segmentation" capabilities provided by most commercial off-the-shelf streaming servers.

Figure 2:
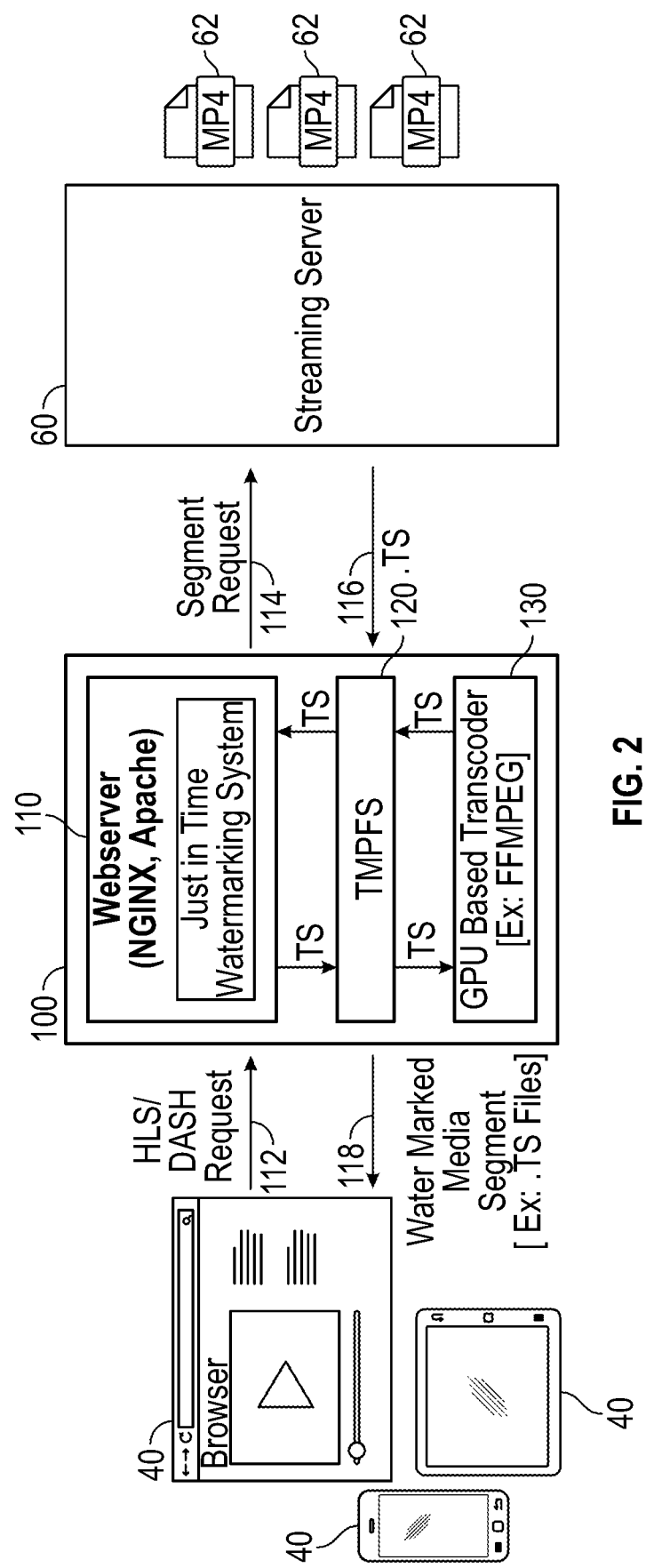
FIG. 2 illustrates a traditional stream content system architecture for just-in-time embedded watermarking of streaming digital content, in accordance with one or more implementations.

Referring now to FIG. 2, in some implementations of the system and method for just-in-time embedded watermarking of streaming digital content 100, the just-in-time embedded watermarking system is deployed within a web server 110 (NGINX, Apache, or the like) that is positioned between the content player device 40 of a user and the streaming server 60. Significantly, the system and method for just-in-time embedded watermarking of streaming digital content 100 intercepts the request 112 by the user for a specific "streaming segment" of content 62, which was originally intended for the streaming server 60. The just-in-time embedded watermarking system then forwards the segment request 114 to the streaming server 60 (i.e., its original destination). The system and method for just-in-time embedded watermarking of streaming digital content 100 also intercepts the requested streaming segment of content 116 from the streaming server 60 and transcodes the streaming segment of content 62 before sending the watermarked segment of content 118 to the content player device 40 of the user.

Notably, in some implementations, the just-In-Time Embedded watermarking system 100 is also associated with a temporary file storage memory (TMPFS) 120 and a GPU-based transcoder 130. The just-in-time embedded watermarking system 100 works in conjunction with the temporary file storage memory 120 and the GPU-based transcoder 130 to transcode the "streaming segment" of content 62 and burn-in the user-specific watermark for the segment of content 62. In some implementations, the segments 62 are saved as .ts media files, which are transport stream files. Once transcoded, this streaming segment of content (e.g., .ts media files) is delivered 118 to the content player device 40 of the user for playback. By way of example only, and not by way of limitation, the content player device 40 may be a desktop browser, a laptop browser, a tablet browser (e.g., iPad browser, Surface browser, and the like), a phablet browser, a smart phone browser, and the like.

In one or more implementations, the system and method for just-in-time embedded watermarking of streaming digital content 100 transcodes an adaptive streaming (e.g., HLS or DASH) segment, on an as-needed basis per request, instead of a massive transcoding of each and every segment in bulk. The system and method for just-in-time embedded watermarking of streaming digital content 100 employs adaptive HTTP streaming technology. Adaptive HTTP streaming technology can generate different versions of the same content (e.g., different bit rates, resolutions, and the like) and slice this content into short segments. Typical segment sizes are 1, 2, 4, 5, 6, 10, and 15 second segment lengths. In one or more implementations, the segments 62 are provided on the streaming server 60, and are downloadable by using HTTP standard compliant GET requests. In some implementations, the adaptation to the bit rate, resolution, and the like, is performed on the client side for each segment 62, such that the client may switch to a higher bit rate or to a lower bit rate, as required by device/system capabilities, network capabilities, and/or user preferences.

In some implementations, the system and method for just-in-time embedded watermarking of streaming digital content 100 employs a Wowza streaming engine 60. A Wowza streaming engine is scalable server software that powers reliable video and audio streaming to any device. In one or more implementations, the system and method for just-in-time embedded watermarking of streaming digital content 100 transcodes five second segments "on the fly" (i.e., in real-time). When the system transcodes using a Graphic Processing Unit (GPU) at "five times" (normal real-time speed), the transcoding is faster than a user performing the playback in real-time. Accordingly, the system 100 transcodes more than a sufficient amount of content to be buffered for smooth playback. Thus, the system and method for just-in-time embedded watermarking of streaming digital content 100 provides a consistent and predictable experience all of the time, including when the user is seeking or scrubbing back and forth in the time-line of the content.

In some implementations, the system and method for just-in-time embedded watermarking of streaming digital content 100 utilizes sequential processing, instead of parallel processing for embedded watermarking. Parallel processing typically requires parallel servers, which creates significantly increased costs and complexity to the system architecture. Instead, the system and method for just-in-time embedded watermarking of streaming digital content 100 employs sequential processing, which may be performed by a single server, to retrieve the requested content segment on an as-needed basis.

Due to the system and method for just-in-time embedded watermarking of streaming digital content 100 employing as-needed transcoding technique, in response to user segment requests, the system automatically supports adaptive bit rate optimization by providing interoperability with multiple potential adaptive bit rates requestable by the content player device. In this regard, the just-In-Time Embedded watermarking system 100 does not have to transcode bit rate and resolution versions of the content that are not requested by the user. In contrast, traditional systems that employ massive transcoding of each and every segment in bulk, do not typically support adaptive bit rate optimization, since these systems have to perform bulk transcoding without knowing the user-desired bit rate and resolution.

In one or more implementations, the selection and transcoding of streaming segments of content 62 occurs in real-time, and with acceptable user experience, since the system for just-in-time embedded watermarking of streaming digital content 100 is deployed on a web server 110 with a Graphic Processing Unit (GPU). The web server 110 and GPU-based transcoder 130 that are employed by the system for just-in-time embedded watermarking of streaming digital content 100 provide transcode speeds of "three times" to "six times" the real-time duration of the segment. For example, a four second segment is generally expected to by transcoded in approximately one second (i.e., for a "four times" transcoder). By utilizing this level of transcode speed, a streaming content player device 40 is easily able to fill its buffers and provide a smooth experience throughout the duration of the video. In one or more implementations, a brief "buffering" experience may occur during start-up and player-seek operations, which is consistent with the play of non-watermarked content streaming, and thus is acceptable and predictable, as described above. Additionally, player speeds of up to "two times" or "three times" also result in a buffer-free playback experience.

In some implementations of the system for just-in-time embedded watermarking of streaming digital content 100, when a user starts playback of an asset (i.e., content), this initiates a series of segment requests. The media segment requests 112 are intercepted by a web server 110, and then the segment requests 114 are up-streamed to a media streaming server 60. The streaming server 60 segments the MP4 file into segmented MP4 files (e.g., .ts media files), which are present on a storage platform, and then returns a requested segment (i.e., segments of content 116) to the web server 110.

Continuing, in some implementations of the system and method for just-in-time embedded watermarking of streaming digital content 100, the web server 110 then persists the segment of content 62 received from the streaming server 60 onto a temporary file storage memory (TMPFS) 120 for the next step in the process. The TMPFS 120 is typically stored in volatile memory instead of a persistent storage device. After persisting the segment of content 62, the web server 110 invokes a GPU-based transcoder 130, such as FFMPEG, to watermark the media file (e.g., segment of content 62) by transcoding the file. FFMPEG is a content player application for handling video, audio, and other multimedia files and streams. Specifically, FFMPEG employs command-line-based processing of video and audio files, and may be used for format transcoding, basic editing, and video post-production effects. User-specific details like username, email address, and IP address, which are used for user-specific embedded watermarking the segment, are supplied as part of the FFMPEG command. Upon completion of the transcoding process, the watermarked segment 118 is served back as a response to the content player device 40 of the user by the web server 110. The segment of content 62 is then deleted from the TMPFS 120 after serving the watermarked segment 118 is back to the content player device 40 of the user as a response.

In some implementations, the system and method for just-in-time embedded watermarking of streaming digital content 100 utilizes GPU-based transcoding and optimizations, such as Adaptive Bit Rate and Segment Prefetching in the content player device 40. By incorporating GPU-based transcoder 130, the system and method for just-in-time embedded watermarking of streaming digital content 100 is able to achieve transcoding speeds in the range of "three times" to at least "six times" the (real-time) duration of the video. The chart below shows the increased performance of GPU-based watermarking over CPU-based watermarking.

| | Bit Rates | | | |
|---|---|---|---|---|
| Watermarking Variant | 512 Kbps | 1 Mbps | 1.5 Mbps | 5 Mbps |
| GPU-based watermarking | 924 ms | 1092 ms | 1278 ms | 1937 ms |
| CPU-based watermarking | 637 ms | 1048 ms | 1609 ms | 3336 ms |

In some implementations of the system and method for just-in-time embedded watermarking of streaming digital content 100, the streaming server 60 is set-up using an NV6 Virtual Machine from the Azure Virtual Machine Stack. The NV6 hardware specifications are: Cores 6, GPU 1×M60 GPU (1/2 Physical Card); Memory 56 GB; and Disk 380 GB SSD. In the case of GPU-based command, for a single streaming user, the GPU utilization in the NV6 card was approximately 10%, while for 5 Mbps the GPU utilization was approximately 15%-18%.

Figure 3:
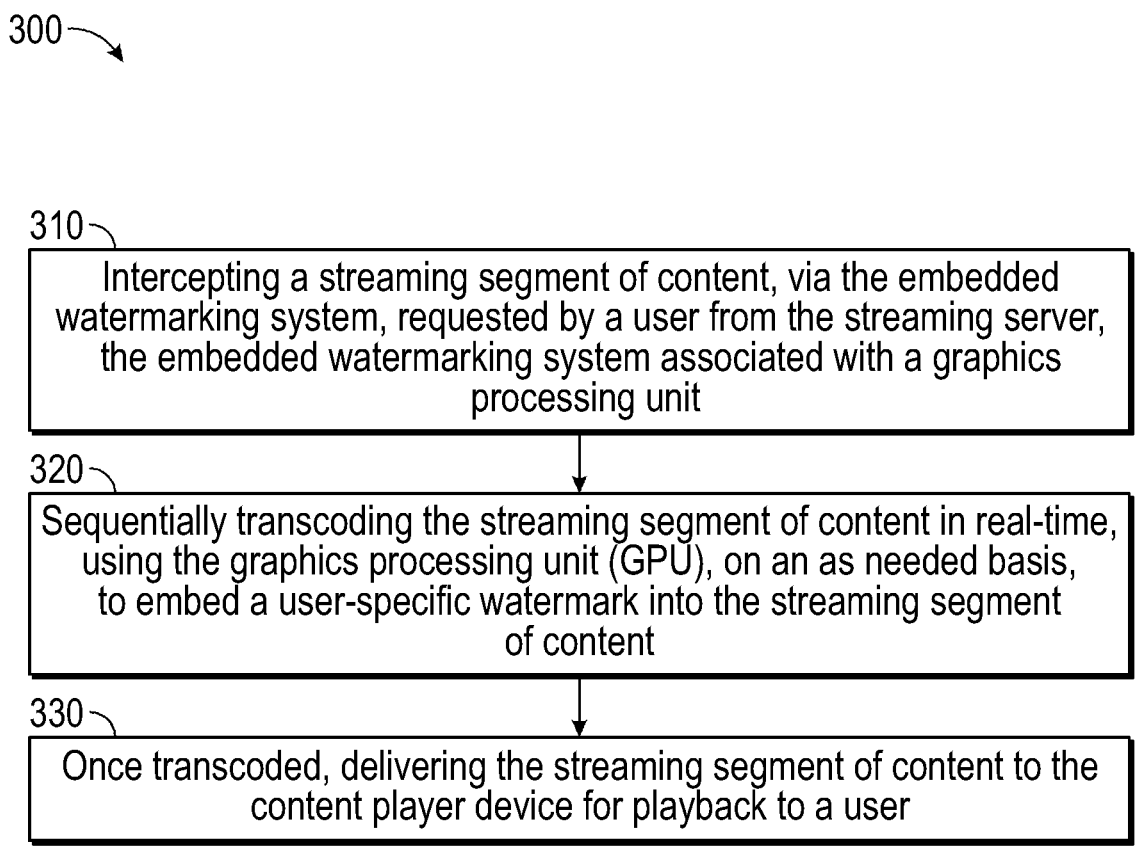
FIG. 3 illustrates a logic flow diagram of a method of just-in-time embedded watermarking of streaming digital content, in accordance with one or more implementations.

Referring now to FIG. 3, a method for just-in-time embedded watermarking of streaming digital content 300 is shown. The method 300 includes, at 310, intercepting a streaming segment of content 62, via the embedded watermarking system 100, requested by a user from the streaming server 60, the embedded watermarking system 100 associated with a graphics processing unit 130. The method 300 includes, at 320, sequentially transcoding the streaming segment of content 62 in real-time, using the graphics processing unit 130, on an as-needed basis, to embed a user-specific watermark into the streaming segment of content 62. The method 300 includes, at 330, once transcoded, delivering the streaming segment of content 62 to the content player device 40 for playback to a user.

Figure 4:
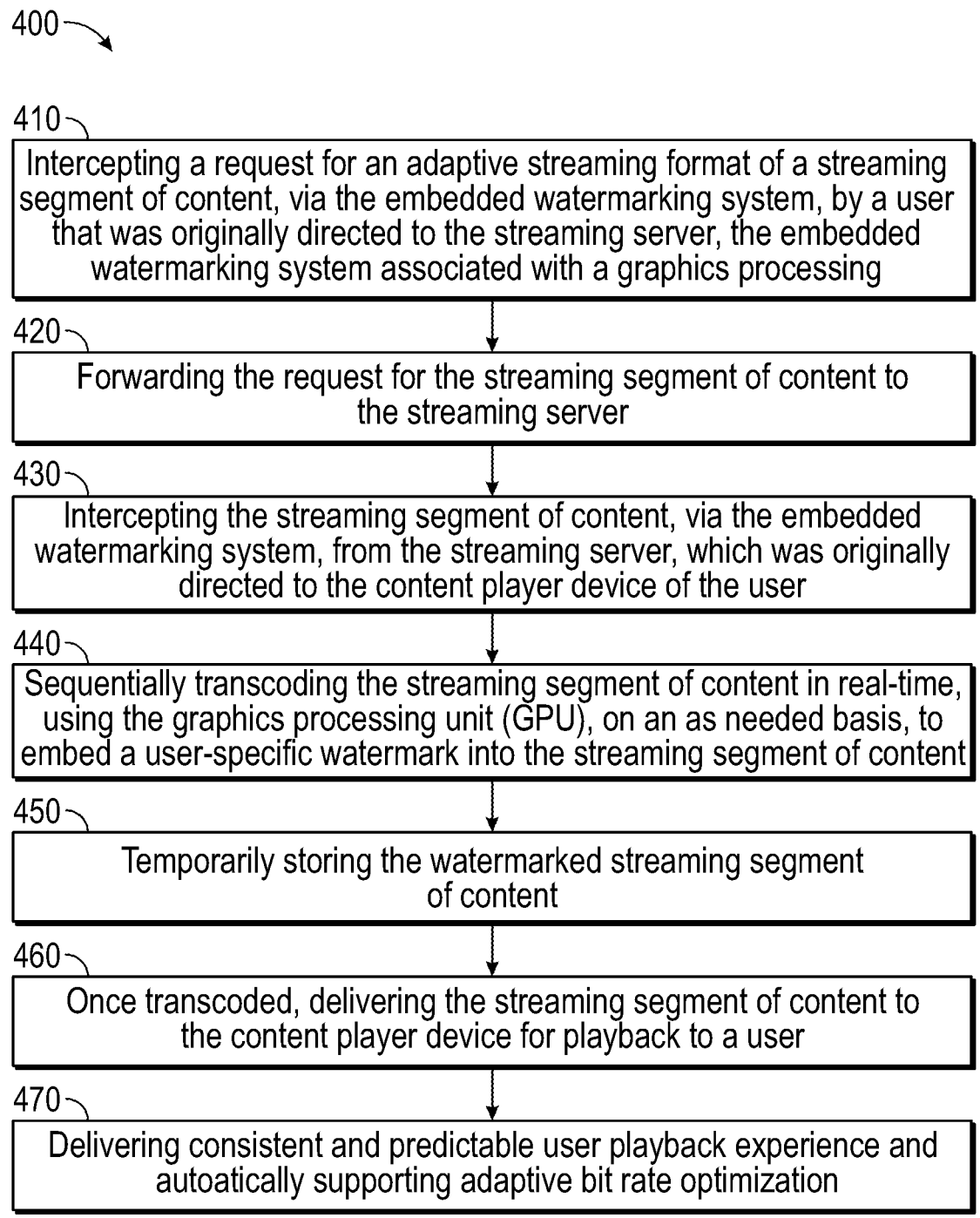
FIG. 4 illustrates a logic flow diagram of another method of just-in-time embedded watermarking of streaming digital content, in accordance with one or more implementations.

Referring now to FIG. 4, a method for just-in-time embedded watermarking of streaming digital content 400 is shown. The method 400 includes, at 410, intercepting a request for an adaptive streaming format of a streaming segment of content 62, via the embedded watermarking system 100, by a user that was originally directed to the streaming server 60, the embedded watermarking system 100 associated with a graphics processing unit 130. The method 400 includes, at 420, forwarding the request for the streaming segment of content 62 to the streaming server 60. The method 400 includes, at 430, intercepting the streaming segment of content 62, via the embedded watermarking system 100, from the streaming server 60, which was originally directed to the content player device 40 of the user. The method 400 includes, at 440, sequentially transcoding the streaming segment of content 62 in real-time, using the graphics processing unit 130, on an as-needed basis, to embed a user-specific watermark into the streaming segment of content 62. The method 400 includes, at 450, temporarily storing the watermarked streaming segment of content 62. The method 400 includes, at 460, once transcoded, delivering the watermarked streaming segment of content 62 to the content player device 40 for playback to the user. The method 400 includes, at 470, delivering consistent and predictable user playback experience and automatically supporting adaptive bit rate optimization.

In the system and method for just-in-time embedded watermarking of streaming digital content 100, various aspects of the systems, methods, functions, steps, features, and the like corresponding thereto may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

In some embodiments of the system and method for just-in-time embedded watermarking of streaming digital content 100, virtualization computing techniques, cloud computing techniques, web application/web site computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

One or more embodiments of the system and method for just-in-time embedded watermarking of streaming digital content 100 utilizes streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bit rate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bit rate of the data. Adaptive streaming may also be implemented. Similar to traditional streaming, data is encoded into discrete packets of a particular size; however, the source data is encoded at multiple bit rates rather than a single bit rate. The data packets corresponding to the same data encoded at different bit rates are then indexed based on the bit rate in memory. This streaming method works by measuring, in real-time, the available bandwidth and computer capacity of the client device, and adjusts which indexed data packet to transfer based on the encoded bit rate.

Those of ordinary skill in the art will appreciate that one or more circuits and/or software may be used to implement the system and method for just-in-time embedded watermarking of streaming digital content 100. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

Certain words and phrases used in the system and method for just-in-time embedded watermarking of streaming digital content 100 are set forth as follows. As used throughout this document, including the claims, the singular form "a," "an," and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases are provided throughout this patent document. Those of ordinary skill in the art will understand that in many, if not most instances, such definitions apply to prior as well as future uses of such defined words and phrases.

In the system and method for just-in-time embedded watermarking of streaming digital content 100, memory may be used in a variety of configurations. As known by one skilled in the art, each memory comprises any combination of volatile and non-volatile, transitory and non-transitory computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, and the like. In these cases, it is understood that the different divisions of memory may be in different devices or embodied in a single memory. The memory may be configured to store data.

In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As described herein in the system and method for just-in-time embedded watermarking of streaming digital content 100, where a range of values is provided, it is understood that each intervening value, to the tenth of the unit of the lower limit unless the context clearly dictates otherwise, between the upper and lower limit of that range and any other stated or intervening value in that stated range, is encompassed within the invention. Also encompassed within the invention, the upper and lower limits of these smaller ranges may be independently included in the smaller ranges, subject to any specifically excluded limit in the stated range. Where the stated range includes one or both of the limits, ranges excluding either or both of those included limits are also included in the invention. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

What is claimed is:

1. A method for segment-based embedded watermarking of streaming digital content, wherein a segment-based embedded watermarking system is positioned between a content player device of a user and a streaming server, the method comprising:
intercepting streaming segments of content, via the segment-based embedded watermarking system, requested by the user from the streaming server, the segment-based embedded watermarking system associated with a graphics processing unit (GPU);
sequentially transcoding only the requested streaming segments of content one segment at a time just in time for each segment to be streamed, using the GPU, on an as-needed basis in response to the request, to embed a user-specific watermark into the streaming segments of content;
once transcoded, delivering the streaming segments of content one segment at a time to the content player device for playback to the user;
employing fast transcoding speeds of the GPU that deliver a consistent and predictable user playback experience; and
automatically supporting adaptive bit rate optimization by providing interoperability with multiple potential adaptive bit rates, wherein adaptive bit rate content is transcoded in response to a request without transcoding bit rate and resolution versions of the content that are not requested.

2. The method of claim 1, wherein the streaming segments of content are in an adaptive streaming format selected from Dynamic Adaptive Streaming over HTTP (DASH), HTTP Live Streaming (HLS), Microsoft Smooth Streaming (MSS), and HTTP Dynamic Streaming (HDS).

3. The method of claim 1, wherein each streaming segment of content has a segment length of 1, 2, 4, 5, 6, 10, or 15 seconds.

4. The method of claim 1, wherein the segment-based embedded watermarking system resides on a web server, and wherein the web server persists the streaming segments of content received from the streaming server onto a TMPFS (Temporary File Storage Memory) partition.

5. The method of claim 1, wherein the segment-based embedded watermarking system on the web server employs FFMPEG (Fast Forward Motion Picture Experts Group) to provide GPU-based transcoding of the streaming segments of content.

6. The method of claim 5, wherein user-specific details, which are used for user-specifically embedded watermarking of the streaming segments of content, are supplied as part of a FFMPEG (Fast Forward Motion Picture Experts Group) command.

7. The method of claim 1, wherein the segment-based embedded watermarking system incorporates GPU-based transcoding and optimizations that include segment prefetching.

8. The method of claim 1, wherein the segment-based embedded watermarking system produces transcoding speeds in a range of three to six times real-time speed.

9. The method of claim 8, wherein the segment-based embedded watermarking system utilizes a GPU-based Virtual Machine from a Virtual Machine Stack.

10. The method of claim 1, wherein the segment-based embedded watermarking system incorporates GPU-based transcoding without any central processing unit (CPU)-based transcoding being performed, and wherein the segment-based embedded watermarking system incorporates sequential processing without any parallel processing being performed.

11. A system for segment-based embedded watermarking of streaming digital content positioned between a content player device of a user and a streaming server, the segment-based embedded watermarking system comprising:
one or more processors; and
a memory device storing a set of instructions that when executed by the one or more processors, causes the one or more processors to:
intercept streaming segments of content, via the segment-based embedded watermarking system, requested by the user from the streaming server, the segment-based embedded watermarking system in communication with a graphics processing unit (GPU);
sequentially transcode only the requested streaming segments of content one segment at a time just in time for each segment to be streamed, using the GPU, on an as-needed basis in response to the request, to embed a user-specific watermark into the streaming segments of content;
once transcoded, deliver the streaming segments of content one segment at a time to the content player device for playback to the user;
employ fast transcoding speeds of the GPU that deliver a consistent and predictable user playback experience; and
automatically support adaptive bit rate optimization by providing interoperability with multiple potential adaptive bit rates, wherein adaptive bit rate content is transcoded in response to a request without transcoding bit rate and resolution versions of the content that are not requested.

12. The segment-based embedded watermarking system of claim 11, wherein the streaming segments of content are in an adaptive streaming format selected from Dynamic Adaptive Streaming over HTTP (DASH), HTTP Live Streaming (HLS), Microsoft Smooth Streaming (MSS), and HTTP Dynamic Streaming (HDS).

13. The segment-based embedded watermarking system of claim 11, wherein each streaming segment of content has a segment length of 1, 2, 4, 5, 6, 10, or 15 seconds.

14. The segment-based embedded watermarking system of claim 11, wherein the segment-based embedded watermarking system resides on a web server, and wherein the web server persists the streaming segments of content received from the streaming server onto a TMPFS (Temporary File Storage Memory) partition.

15. The segment-based embedded watermarking system of claim 11, wherein the segment-based embedded watermarking system on the web server employs FFMPEG (Fast Forward Motion Picture Experts Group) to provide GPU-based transcoding of the streaming segments of content.

16. The segment-based embedded watermarking system of claim 15, wherein user-specific details, which are used for user-specifically embedded watermarking the streaming segments of content, are supplied as part of a FFMPEG (Fast Forward Motion Picture Experts Group) command.

17. The segment-based embedded watermarking system of claim 11, wherein the segment-based embedded watermarking system incorporates GPU-based transcoding and optimizations that include segment prefetching.

18. The segment-based embedded watermarking system of claim 11, wherein the segment-based embedded watermarking system produces transcoding speeds in a range of three to six times real-time speed.

19. The segment-based embedded watermarking system of claim 18, wherein the segment-based embedded watermarking system utilizes a GPU-based Virtual Machine from a Virtual Machine Stack.

20. The segment-based embedded watermarking system of claim 11, wherein the segment-based embedded watermarking system incorporates GPU-based transcoding without any central processing unit (CPU)-based transcoding being performed, and wherein the segment-based embedded watermarking system incorporates sequential processing without any parallel processing being performed.

21. A system for segment-based embedded watermarking of streaming digital content that is positioned between a content player device of a user and a streaming server, the segment-based embedded watermarking system comprising:
   a web server configured to intercept streaming segments of content requested by the user from the streaming server;
   a graphics processing unit (GPU) associated with a graphics processing unit-based transcoder and the web server, wherein the graphics processing unit sequentially transcodes only the requested streaming segments of content one segment at a time just in time for each segment to be streamed, on an as-needed basis in response to the request, and embeds a user-specific watermark into the streaming segments of content;
   wherein the web server delivers the watermarked streaming segments of content one segment at a time to the content player device for playback to the user;
   wherein the segment-based embedded watermarking system employs fast transcoding speeds of the GPU that delivers a consistent and predictable user playback experience, and wherein the segment-based embedded watermarking system automatically supports adaptive bit rate optimization by providing interoperability with multiple potential adaptive bit rates, wherein adaptive bit rate content is transcoded in response to a request without transcoding bit rate and resolution versions of the content that are not requested.

22. The segment-based embedded watermarking system of claim 21, wherein the streaming segments of content are in an adaptive streaming format selected from Dynamic Adaptive Streaming over HTTP (DASH), HTTP Live Streaming (HLS), Microsoft Smooth Streaming (MSS), and HTTP Dynamic Streaming (HDS).

23. The segment-based embedded watermarking system of claim 21, wherein each streaming segment of content has a segment length of 1, 2, 4, 5, 6, 10, or 15 seconds.

24. The segment-based embedded watermarking system of claim 21, wherein the web server persists the streaming segments of content received from the streaming server onto a TMPFS (Temporary File Storage Memory) partition.

25. The segment-based embedded watermarking system of claim 21, wherein the segment-based embedded watermarking system on the web server employs FFMPEG (Fast Forward Motion Picture Experts Group) to provide GPU-based transcoding of the streaming segments of content.

26. The segment-based embedded watermarking system of claim 25, wherein user-specific details, which are used for user-specifically embedded watermarking of the streaming segments of content, are supplied as part of a FFMPEG (Fast Forward Motion Picture Experts Group) command.

27. The segment-based embedded watermarking system of claim 21, wherein the segment-based embedded watermarking system incorporates GPU-based transcoding and optimizations that include segment prefetching.

28. The segment-based embedded watermarking system of claim 21, wherein the segment-based embedded watermarking system produces transcoding speeds in a range of three to six times real-time speed.

29. The segment-based embedded watermarking system of claim 28, wherein the segment-based embedded watermarking system utilizes a GPU-based Virtual Machine from a Virtual Machine Stack.

30. The segment-based embedded watermarking system of claim 21, wherein the segment-based embedded watermarking system incorporates GPU-based transcoding without any central processing unit (CPU)-based transcoding being performed, and wherein the segment-based embedded watermarking system incorporates sequential processing without any parallel processing being performed.

31. A method for segment-based embedded watermarking of streaming digital content, wherein an segment-based embedded watermarking system is positioned between a content player device of a user and a streaming server, the method comprising:
   intercepting a request for an adaptive streaming format of streaming segments of content, via the segment-based embedded watermarking system, by the user that was originally directed to the streaming server, the segment-based embedded watermarking system associated with a graphics processing unit (GPU);
   forwarding the request for an adaptive streaming format of the streaming segments of content to the streaming server;
   intercepting the streaming segments of content, via the segment-based embedded watermarking system, from the streaming server, which was originally directed to the content player device of the user;
   sequentially transcoding only the requested streaming segments of content one segment at a time just in time for each segment to be streamed, using the graphics processing unit, on an as-needed basis in response to the request, to embed a user-specific watermark into the streaming segments of content;
   temporarily storing the watermarked streaming segments of content;
   once transcoded, delivering the watermarked streaming segments of content one segment at a time to the content player device for playback to the user;
   employing fast transcoding speeds of the GPU that deliver a consistent and predictable user playback experience; and
   automatically supporting adaptive bit rate optimization by providing interoperability with multiple potential adaptive bit rates, wherein adaptive bit rate content is transcoded in response to a request without transcoding bit rate and resolution versions of the content that are not requested.

* * * * *